United States Patent
Lin et al.

(10) Patent No.: US 9,755,422 B2
(45) Date of Patent: Sep. 5, 2017

(54) POWER PROTECTION APPARATUS AND METHOD

(71) Applicant: Delta Electronics, Inc., Taoyuan Hsien (TW)

(72) Inventors: Che-Hung Lin, Taoyuan Hsien (TW); Yueh-Lung Huang, Taoyuan Hsien (TW); Yen-Hung Chen, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 204 days.

(21) Appl. No.: 14/022,835

(22) Filed: Sep. 10, 2013

(65) Prior Publication Data
US 2014/0218828 A1   Aug. 7, 2014

(30) Foreign Application Priority Data
Feb. 5, 2013   (TW) .............................. 102104324 A

(51) Int. Cl.
*H02H 3/20* (2006.01)
*H02H 7/09* (2006.01)

(52) U.S. Cl.
CPC .............. *H02H 7/09* (2013.01); *H02H 3/207* (2013.01)

(58) Field of Classification Search
CPC ................ H02H 9/04; H02P 9/10; H02P 9/07
USPC ............................ 361/18, 78, 188, 190, 193.1
See application file for complete search history.

(56) References Cited

U.S. PATENT DOCUMENTS

| | | | |
|---|---|---|---|
| 8,482,885 B2 * | 7/2013 | Billingsley et al. | 361/8 |
| 8,520,349 B2 * | 8/2013 | Billingsley et al. | 361/91.1 |
| 2008/0247105 A1 * | 10/2008 | Divan | 361/56 |
| 2010/0085673 A1 * | 4/2010 | Lee | 361/90 |

* cited by examiner

*Primary Examiner* — Bickey Dhakal
(74) *Attorney, Agent, or Firm* — Muncy, Geissler, Olds & Lowe, P.C.

(57) ABSTRACT

A power-protection apparatus is provided. The apparatus includes an over-voltage protection unit for generating an over-voltage detection signal when the power supply of the load is over the upper limit of a predetermined voltage range; an under-voltage protection unit for generating an under-voltage detection signal when the power supply of the load is under the lower limit of the predetermined voltage range; a working-state detection unit for receiving a control signal and generating a working-state detection signal when the level time-change rate of the control signal is over a time-change rate threshold; and a power-control unit coupled to the over-voltage protection unit, the working-state detection unit and the under-voltage protection unit for controlling the on and off of the power supply according to the over-voltage detection signal, the under-voltage detection signal or the working-state detection signal.

11 Claims, 5 Drawing Sheets

POWER PROTECTION APPARATUS AND METHOD

CROSS REFERENCE TO RELATED APPLICATIONS

This non-provisional application claims priority under 35 U.S.C. §119(a) on Patent Application No(s). 102,104,324, filed in Taiwan, Republic of China on Feb. 5, 2013, the entire contents of which are hereby incorporated by reference.

BACKGROUND OF THE INVENTION

Field of the Invention

The present invention relates to power-protection apparatuses of motors, and in particular to power-protection apparatuses that save energy.

Description of the Related Art

The prior art provides various circuit-protection methods to prevent the expensive and delicate motors from damage.

The prior art provides three methods for over-voltage protection: method I—improving circuit-element specifications; method II—protecting circuits by using a transient voltage suppressor (TVS); and method III—protecting circuits by using an operational amplifier (OP).

For method I, improving circuit-element specifications means raising the cost, and less choice for the circuit elements. Therefore, method I applies only to simple circuits and is rarely employed. For method II, although using TVS is the mainstream approach, this method is only suitable for eliminating transient high voltage or surges with low power, such as ESD, and circuits may break when the high voltage is sustained. For method III, the OP not only has a higher cost and limited input voltage, but also has complicated circuit design and a slower circuit-reaction speed.

BRIEF SUMMARY OF THE INVENTION

The present invention provides a power-protection apparatus for protecting a load. The apparatus comprises an over-voltage protection unit for generating an over-voltage detection signal when the power supply of the load is over the upper limit of a predetermined voltage range; an under-voltage protection unit for generating an under-voltage detection signal when the power supply of the load is under the lower limit of the predetermined voltage range; a working-state detection unit for receiving a control signal, and generating a working-state detection signal when the pulse width of the control signal is over a predetermined pulse width; and a power-control unit coupled to the over-voltage protection unit, the working-state detection unit and the under-voltage protection unit for controlling the on and off of the power supply according to the over-voltage detection signal, the under-voltage detection signal and the working-state detection signal.

The present invention provides a power-protection method for protecting a load. The method comprises: generating an over-voltage detection signal when the power supply of the load is over the upper limit of a predetermined voltage range; generating an under-voltage detection signal when the power supply of the load is under the lower limit of the predetermined voltage range; receiving a control signal, and generating a working-state detection signal when the pulse width of the control signal is over a predetermined width; and turning off the power supply when receiving an over-voltage detection signal, an under-voltage detection signal, or a working-state detection signal. A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description made for the purpose of illustrating the general principles of the invention and should not be taken in a limiting sense. The scope of the invention is best determined by reference to the appended claims.

Figure 1:
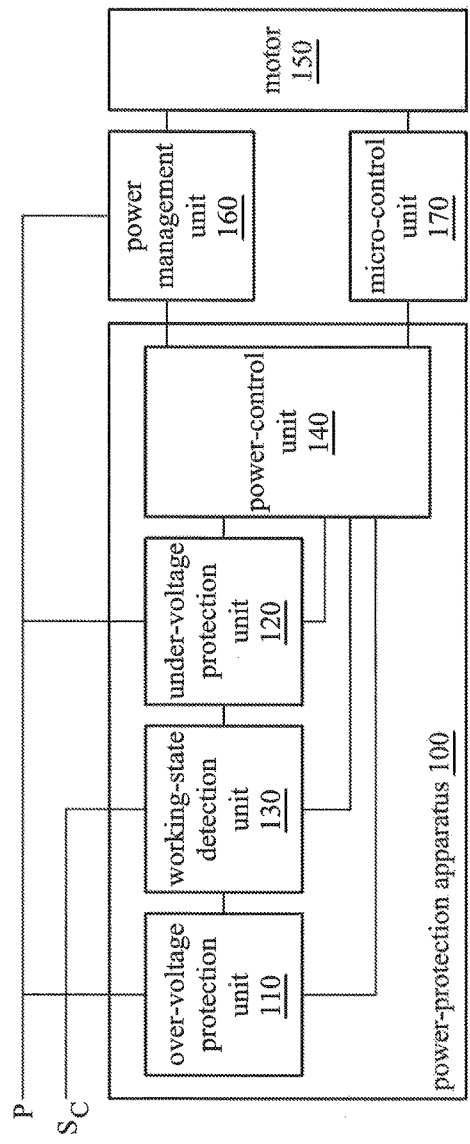
FIG. 1 is a block diagram of the power-protection apparatus according to an embodiment of the present invention.

The power-protection apparatus of the present invention is used to protect the fan motor. FIG. 1 is a power-protection apparatus according to an embodiment of the present invention. In this embodiment, the motor 150 obtains a power supply P from a power source via a power management unit 160, and the rotation speed of the motor 150 is controlled by a rotation-speed control signal $S_C$, which is received from the outside via a micro-control unit 170.

The present invention provides a specific power-protection apparatus 100, where the power-protection apparatus 100 is coupled to the motor 150. The power-protection apparatus 100 of the present invention comprises an over-voltage protection unit 110, an under-voltage protection unit 120, a working-state detection unit 130 and a power-control unit 140. The components of the present invention will be further described in detail in accordance with FIGS. 2A, 2B, 3A, 3B, 4A, and 4B in the following paragraphs.

Figure 2A:
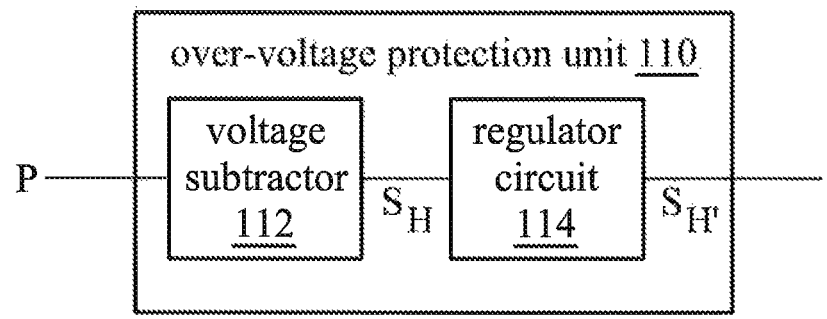
FIG. 2A is a schematic diagram of the over-voltage protection unit according to an embodiment of the present invention.
Figure 2B:
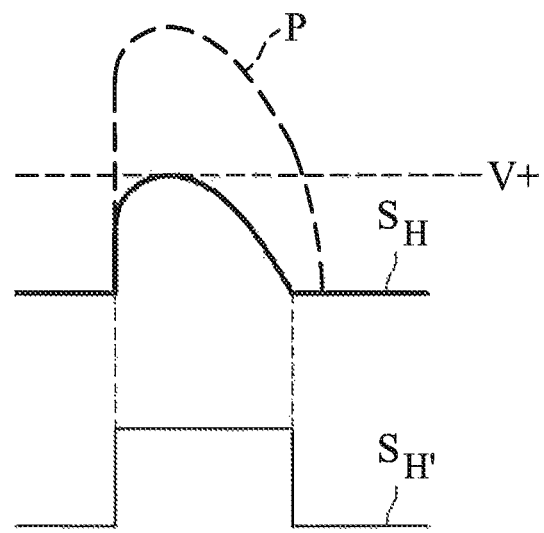
FIG. 2B shows the signals in the over-voltage protection unit in FIG. 2A.

FIG. 2A is a schematic diagram of the over-voltage protection unit 110 according to an embodiment of the present invention. FIG. 2B shows the signals in the over-voltage protection unit 110 in FIG. 2A. The over-voltage protection unit 110 of the present invention can produce an over-voltage detection signal when the power supply P of the motor is over the upper limit V+ of a predetermined voltage range. The over-voltage detection signal can be used by the power-control unit 140, which will be described later. As shown in FIG. 2A, the over-voltage protection unit 110 of the present invention comprises a voltage subtractor 112. The voltage subtractor 112 can subtract the part of the power supply P which is over the upper limit V+ of the predetermined voltage range for directly producing an over-voltage detection signal. As shown in FIG. 2B, when the power supply P has a part that exceeds the upper limit V+ of the predetermined voltage range, the voltage subtractor 112 directly subtracts that part and produces an "over-voltage detection signal SH" (high level). In other words, when the power supply P is not over the upper limit V+ of the predetermined voltage range, the voltage subtractor 112 will not affect the original level of the power supply P and produce any over-voltage detection signal. In some embodiments, the voltage subtractor 112 comprises at least one Zener diode. With the mentioned structure, the over-voltage protection unit 110 of the present invention has no TSV or OP of the prior art that additionally consumes power, thereby saving energy. As shown in FIG. 2A, the over-voltage protection unit 110 of the present invention can further comprise a regulator circuit 114. The regulator circuit 114 can regulate the signals provided by the voltage subtractor 112 so as to make the signals exhibit an ideal waveform that can be accepted by the power-control unit 140 (for example, the square waveform of the over-voltage detection signal SH', as shown in FIG. 2B), thereby avoiding malfunctions.

Figure 3A:
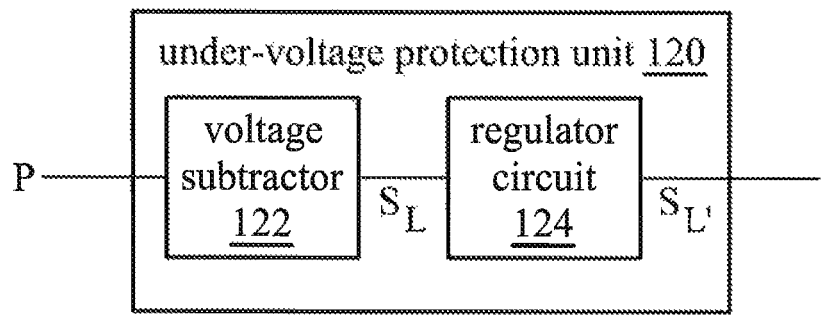
FIG. 3A is a schematic diagram of the under-voltage protection unit according to an embodiment of the present invention.
Figure 3B:
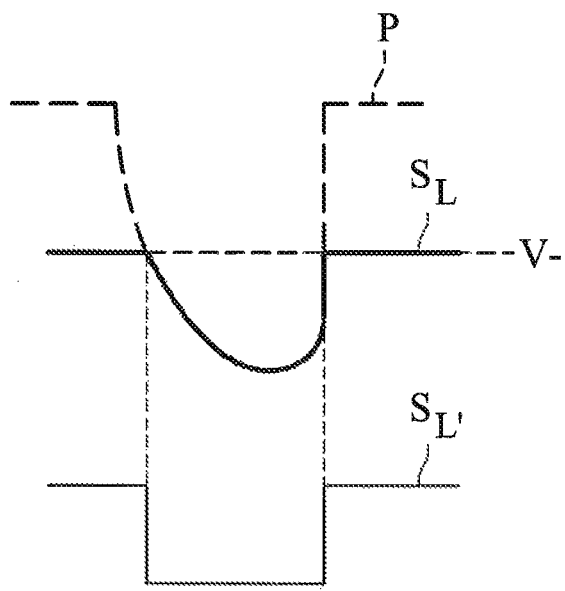
FIG. 3B shows the signals in the under-voltage protection unit in FIG. 3A.

FIG. 3A is a schematic diagram of the under-voltage protection unit 120 according to an embodiment of the present invention. FIG. 3B shows the signals in the under-voltage protection unit 120 in FIG. 3A. In contrast to the over-voltage protection unit 110, the under-voltage protection unit 120 of the present invention can produce an under-voltage detection signal when the power supply P of the motor is under the lower limit V− of the predetermined voltage range. The under-voltage detection signal can be used by the power-control unit 140, which will be described later. In an embodiment, as shown in FIG. 3A, the under-voltage protection unit 120 of the present invention comprises a voltage subtractor 122. The voltage subtractor 122 can subtract the part of the power supply P which is under the lower limit V− of the predetermined voltage range to directly produce the under-voltage detection signal. As shown in FIG. 3B, when the power supply P has apart that is lower than the lower limit V− of the predetermined voltage range, the voltage subtractor 122 filters out that part and produces an under-voltage detection signal $S_L$ (low level). In other words, when the power supply P is not under the lower limit V− of the predetermined voltage range, the voltage subtractor 122 will not affect the original level of the power supply P and produce any under-voltage detection signal. In some embodiments, the voltage subtractor 122 comprises at least one Zener diode. With the aforementioned structure, the under-voltage protection unit 120 of the present invention has no TSV or OP of the prior art which consume additional power, and thus it saves energy. As shown in FIG. 3A, the under-voltage protection unit 120 of the present invention can further comprise a regulator circuit 124. The regulator circuit 124 can regulate the signals provided by the voltage subtractor 122 so as to make the signals exhibit waveforms that can be accepted by the power-control unit 140 (for example, the square waveform of the under-voltage detection signal $S_{L'}$ as shown in FIG. 3A) and avoid malfunctions.

Figure 4A:
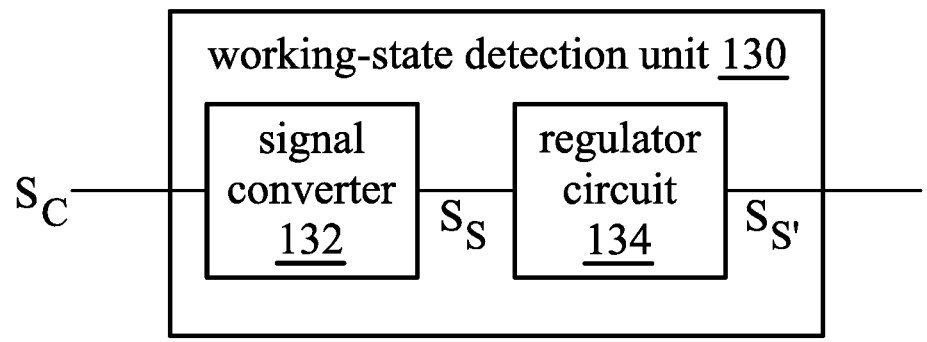
FIG. 4A is a schematic diagram of the working-state detection Unit according to an embodiment of the present invention.
Figure 4B:
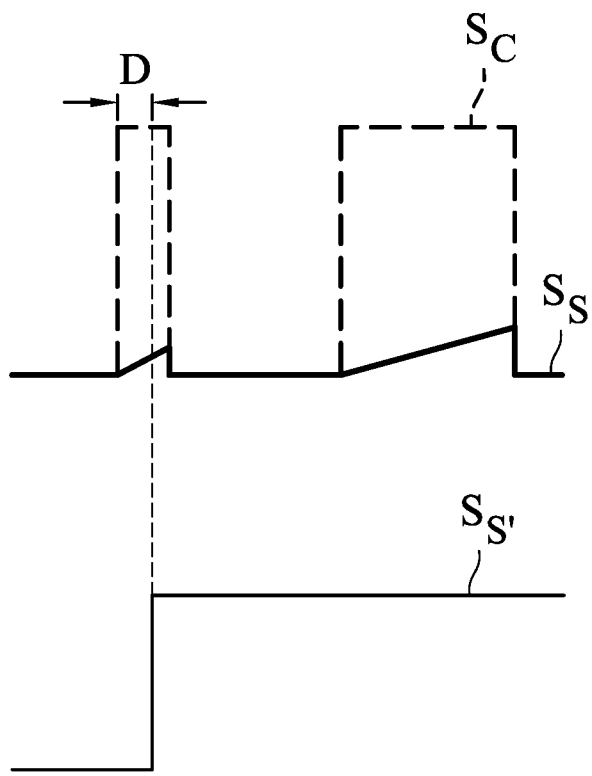
FIG. 4B shows the signals in the working-state detection unit in FIG. 3A.

FIG. 4A is a schematic diagram of the working-state detection unit 130 according to an embodiment of the present invention. FIG. 4B shows the signals in the working-state detection unit 130 in FIG. 4A. The working-state detection unit 130 of the present invention is configured to receive the rotation-speed control signal $S_C$. As shown in FIG. 4A, the working-state detection unit 130 produces a working-state detection signal $S_S$ (with expected signal level) when the pulse width of the rotation-speed control signal $S_C$ exceeds a predetermined pulse width D. The working-state detection signal $S_S$ can be used by the power-control unit 130, which will be described later. As shown in FIG. 4B, the working-state detection unit 130 of the present invention further comprises a signal converter 132. In an embodiment, the signal converter 132 comprises a charging/discharging circuit (for example, an RC circuit) that can control the charging/discharging characteristic of the circuits. As shown in FIG. 4B, the signal converter 132 can convert the rotation-speed control signal $S_C$ which has a varied rotation speed in a period into a working-state detection signal $S_S$ (low level) through charging and discharging characteristic of the circuits. As shown in FIG. 4A, the working-state detection unit 130 of the present invention further comprises a regulator circuit 134. The regulator circuit 134 regulates the signals provided by the signal converter 132 so as to make the signals exhibit waveforms that can be accepted by the power-control unit 140 (for example, the square waveform of the working-state detection signal $S_{S'}$ as shown in FIG. 4B) to avoid malfunctions.

The power-control unit 140 of the present invention is coupled to the over-voltage protection unit 110, the under-voltage protection unit 120 and the working-state detection unit 130 to control the on and off of the power supply P according to the over-voltage detection signal $S_H$ (or $S_{H'}$), the under-voltage detection signal $S_L$ (or $S_{L'}$) and working-state detection signal $S_S$ (or $S_{S'}$). Specifically, the power-control unit 140 comprises logic elements (such as AND, and OR gates), and can turn off the power supply P of the motor 150 when receiving an over-voltage detection signal $S_H$ (or $S_{H'}$), an under-voltage detection signal $S_L$ (or $S_{L'}$), or a working-state detection signal $S_S$ (or $S_{S'}$). In other words, when none of the over-voltage detection signal $S_H$ (or $S_{H'}$), the under-voltage detection signal $S_L$ (or $S_{L'}$), or the working-state detection signal $S_S$ (or $S_{S'}$) is detected by the power-control unit 140, it means that the power supply P and the rotation-speed control signal $S_C$ are in a normal condition, and the power supply P can safely drive the motor 150. The present invention thus provides multiple protections for the motor 150. In some embodiments, as shown in FIG. 1, the power-control unit 140 controls the motor 150 via the power management unit 160 and the micro-control unit 170. However, in other embodiments, the present on should not be limited thereto.

In order to save energy, the working-state detection unit 130 and the under-voltage protection unit 120 in a preferred embodiment of the present invention are both coupled between the over-voltage protection unit 110 and the power-control unit 140 so that they can immediately stop operation once receiving the over-voltage detection signal $S_H$.

Figure 5:
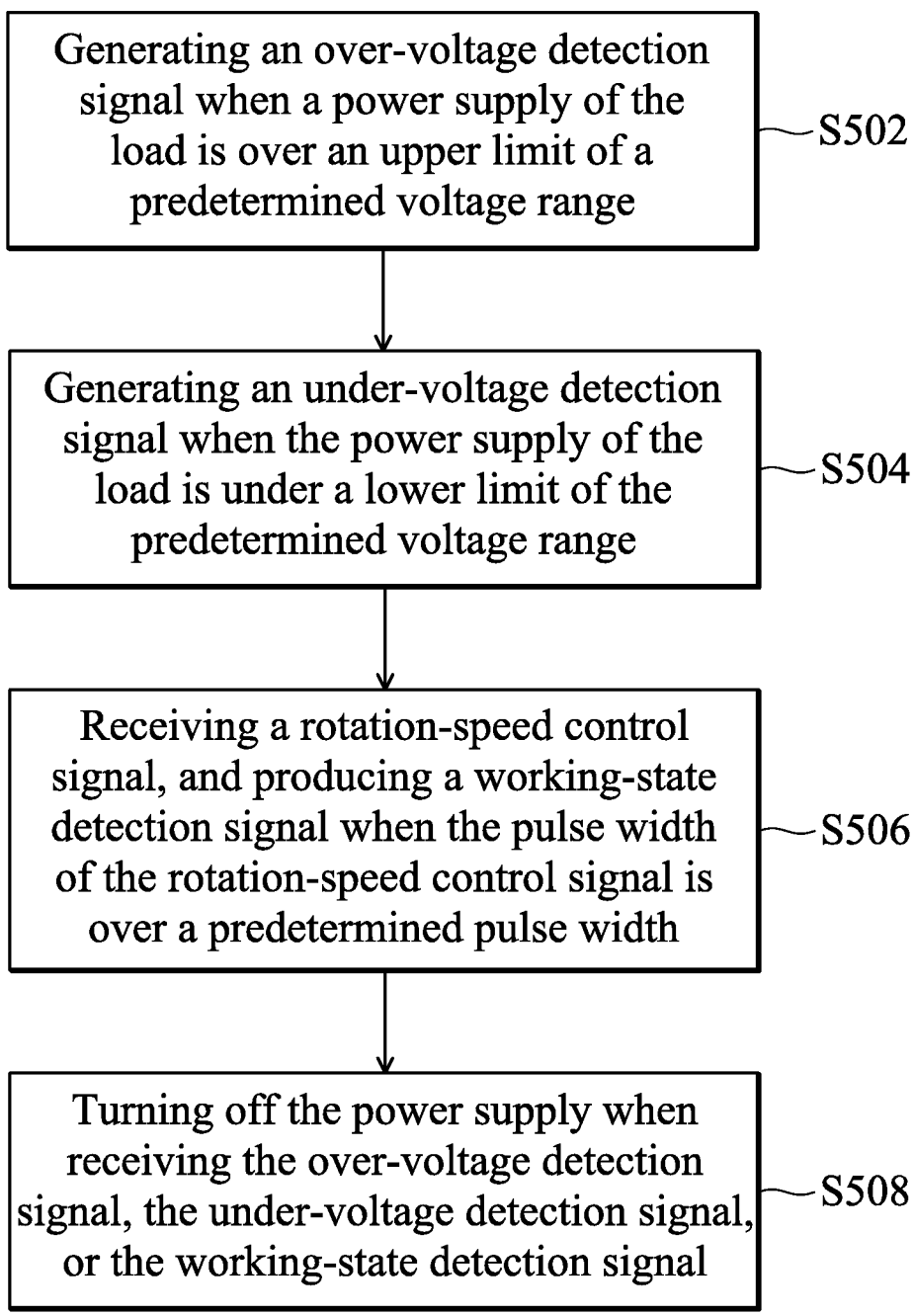
FIG. 5 is a flow chart of the power-protection method according to an embodiment of the present invention.

According to the power-protection apparatus described above, the present invention also provides a power-protection method. FIG. 5 is a flow chart of the power-protection method according to an embodiment of the present invention. The power-protection method is used to protect a motor. The method comprises the steps of producing an over-voltage detection signal when the power supply of the motor is over the upper limit of a predetermined voltage range (step S502); producing an under-voltage detection signal when the power supply of the motor is under the lower limit of the predetermined voltage range (step S504); receiving a rotation-speed control signal, and producing a working-state detection signal when the pulse width of the rotation-speed control signal is over a predetermined pulse width (step S506); and turning off the power supply when receiving the over-voltage detection signal, the under-voltage detection signal, or the working-state detection signal (step S508). Since those skilled in the art can understand the power-protection method of the present invention by referring to the power-protection apparatus described above, the detail of the power-protection method will not be discussed further.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power-protection apparatus for protecting a load, comprising:
    an over-voltage protection unit to generate an over-voltage detection signal when a power supply of the load is over an upper limit of a predetermined voltage range;
    an under-voltage protection unit to generate an under-voltage detection signal when the power supply of the load is under a lower limit of the predetermined voltage range;
    a working-state detection unit to receive a rotation-speed control signal and generating a working-state detection signal when a pulse width of the rotation-speed control signal is over a predetermined pulse width; and
    a power-control unit coupled to the over-voltage protection unit, the working-state detection unit and the under-voltage protection unit for controlling the on and off of the power supply according to the over-voltage detection signal, the under-voltage detection signal or the working-state detection signal.

2. The power-protection apparatus as claimed in claim 1, wherein the power-control unit turns off the power supply when receiving the over-voltage detection signal, the under-voltage detection signal, or the working-state detection signal.

3. The power-protection apparatus as claimed in claim 1, wherein the working-state detection unit is coupled between the over-voltage protection unit and the power-control unit, and shuts down when receiving the over-voltage detection signal.

4. The power-protection apparatus as claimed in claim 1, wherein the under-voltage protection unit is coupled between the over-voltage protection unit and the power-control unit, and shuts down when receiving the over-voltage detection signal.

5. The power-protection apparatus as claimed in claim 1, wherein the over-voltage protection unit comprises:
    a voltage subtractor for subtracting a part of the power supply which is over the upper limit of the predetermined voltage range for producing the over-voltage detection signal.

6. The power-protection apparatus as claimed in claim 5, wherein the over-voltage protection unit further comprises a regulator circuit for regulating signals provided by the voltage subtractor so as to make the signals exhibit a waveform to be accepted by the power-control unit and avoid malfunctions.

7. The power-protection apparatus as claimed in claim 1, wherein the under-voltage protection unit comprises a voltage subtractor for subtracting a part of the power supply that is under the lower limit of the predetermined voltage range to directly produce the under-voltage detection signal.

8. The power-protection apparatus as claimed in claim 7, wherein the under-voltage protection unit further comprises a regulator circuit for regulating the signals provided by the voltage subtractor so as to make the signals exhibit a waveform to be accepted by the power-control unit and avoid malfunctions.

9. The power-protection apparatus as claimed in claim 1, wherein the working-state detection unit comprises a signal converter.

10. The power-protection apparatus as claimed in claim 9, wherein the working-state detection unit further comprises a regulator circuit for regulating a signal provided by the signal converter so as to make the signal exhibit a waveform to be accepted by the power-control unit and avoid malfunctions.

11. A power-protection method for protecting a load, comprising steps of:
    generating an over-voltage detection signal by an over-voltage protection unit when a power supply of the load is over an upper limit of a predetermined voltage range;
    generating an under-voltage detection signal by an under-voltage protection unit when the power supply of the load is under a lower limit of the predetermined voltage range;
    receiving a rotation-speed control signal and generating a working-state detection signal by a working-state detection unit when a pulse width of the rotation-speed control signal is over a predetermined pulse width;
    wherein the working-state detection unit is coupled to the over-voltage protection unit and the under-voltage protection unit; and
    turning off the power supply when receiving the over-voltage detection signal, the under-voltage detection signal, or the working-state detection signal.

* * * * *